Patented June 12, 1934

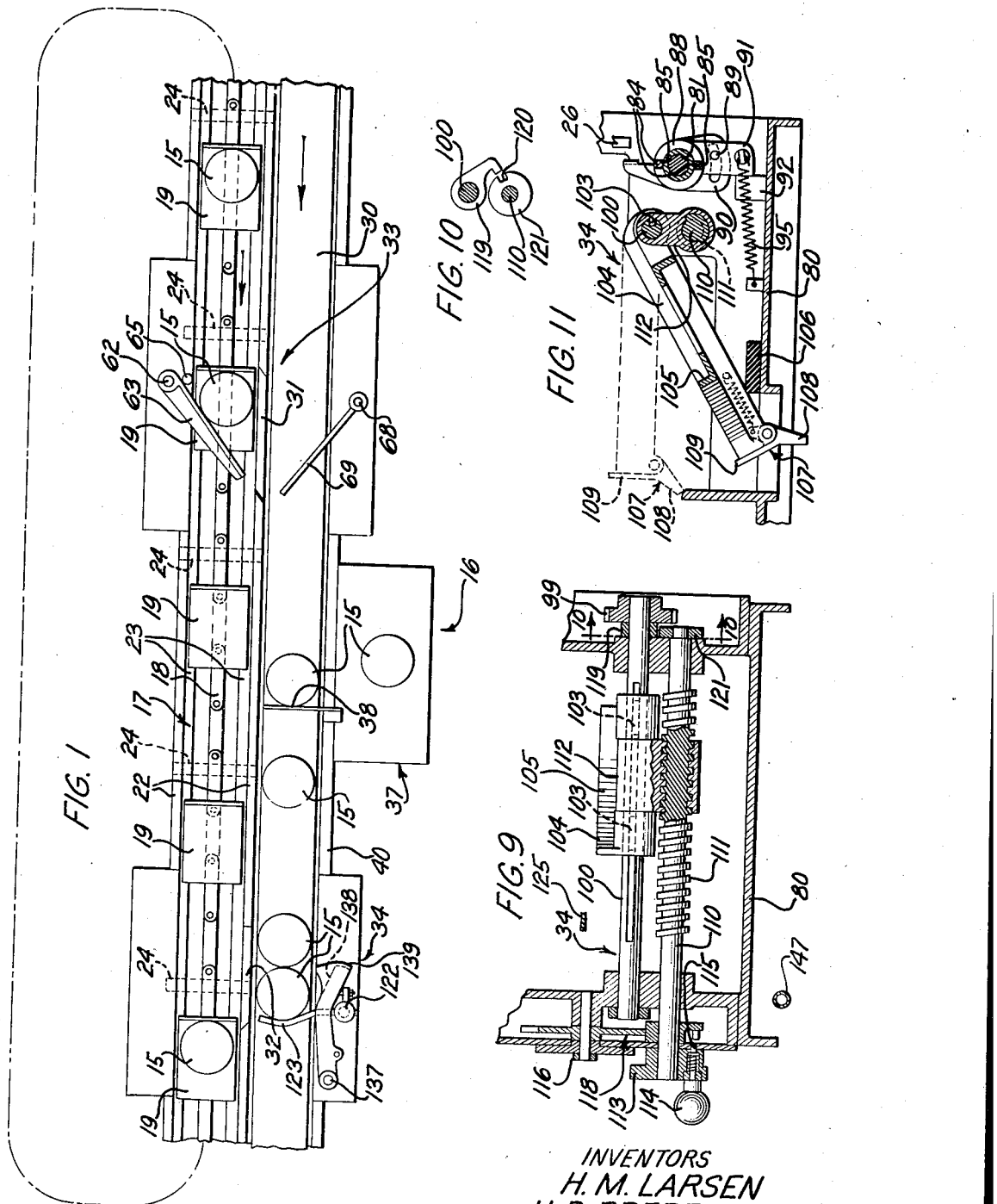
June 12, 1934.  H. M. LARSEN ET AL  1,962,745
CONVEYER SYSTEM
Filed May 13, 1932   3 Sheets-Sheet 1
INVENTORS
H. M. LARSEN
H. D. BREDEHORN
BY H. A. Whitehorn
ATTORNEY

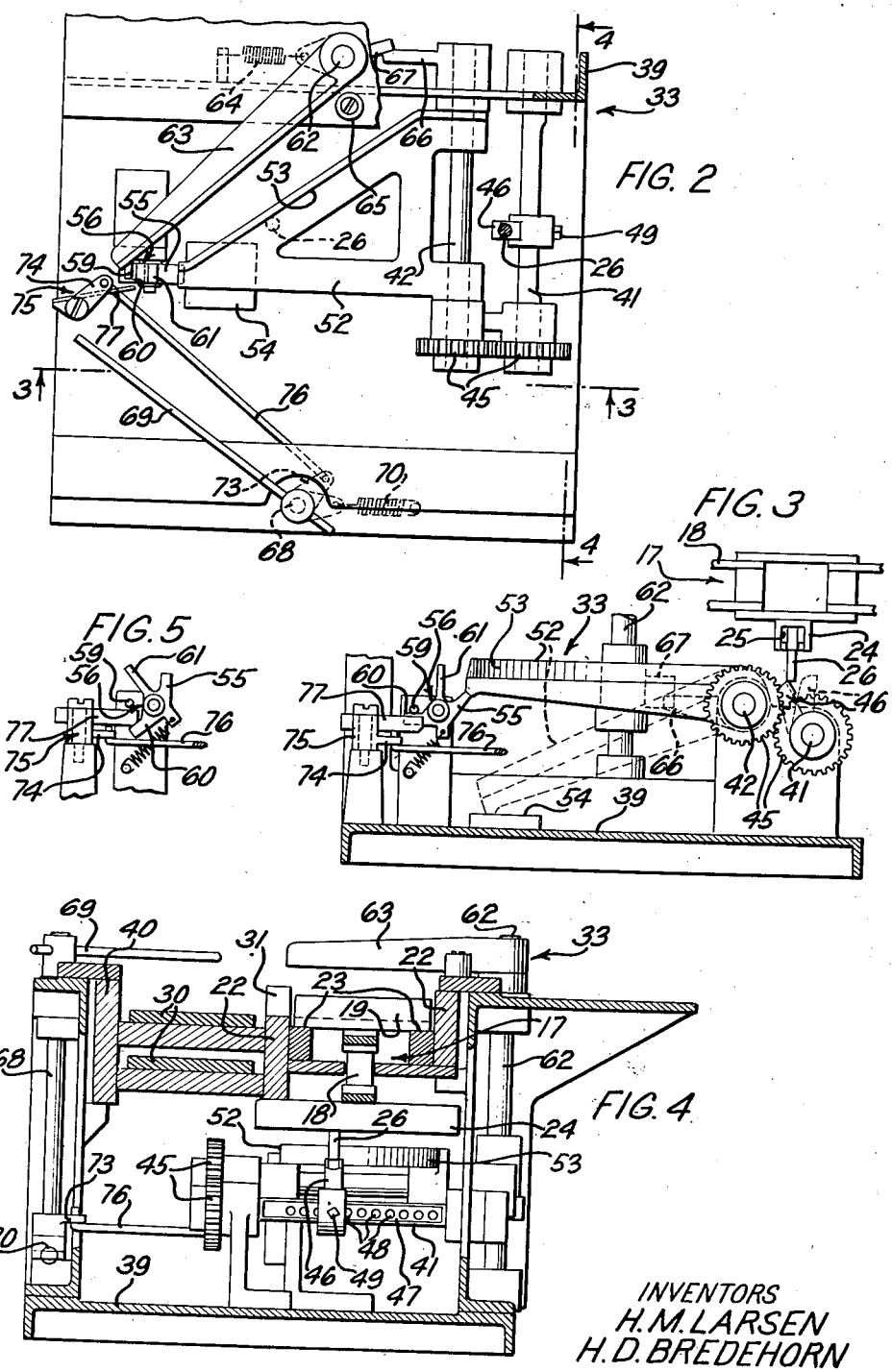

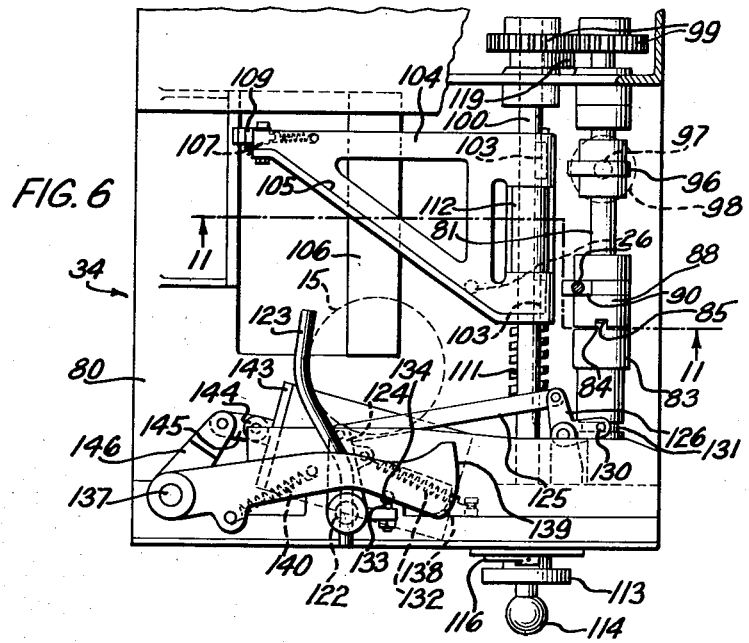
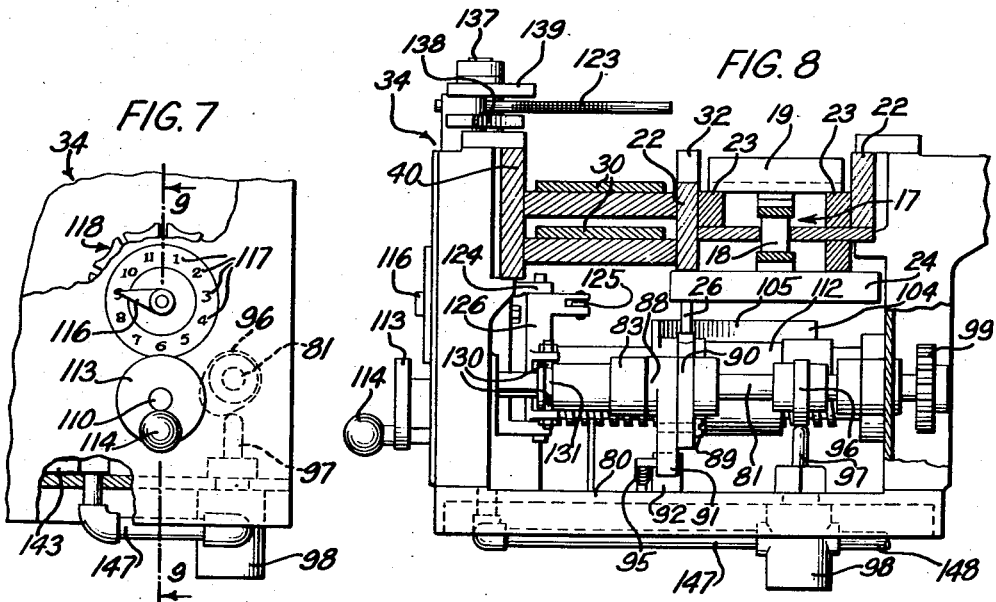

1,962,745

UNITED STATES PATENT OFFICE 1,962,745

CONVEYER SYSTEM

Henry M. Larsen, La Grange, and Herbert D. Bredehorn, Chicago, Ill., assignors to Western Electric Company, Incorporated, New York, N. Y., a corporation of New York Application May 13, 1932, Serial No. 611,026

12 Claims. (Cl. 198—38)

This invention relates to conveyer systems, and more particularly to selective distributing conveyers.

An object of this invention is to provide a conveyer system whereby articles may be efficiently and expeditiously handled and selectively conveyed to predetermined destinations with a minimum amount of manual effort.

In accordance with one embodiment of the invention, a conveying and distributing system is provided wherein an endless traveling conveyer is provided with spaced article receiving and supporting carriers permanently secured thereto, each carrier having a pilot member permanently associated therewith, the pilot members being individually adjustable to effect a selective distribution of the articles from the carriers to predetermined stations spaced along the path of the conveyer. Mechanism is also provided for transferring articles from the several stations onto empty carriers of the conveyer and for simultaneously adjusting the associated pilot members according to the predetermined desired destinations of the articles.

Other objects and advantages of this invention will more fully appear from the following detailed description taken in connection with the accompanying drawings, wherein Fig. 1 is a diagrammatic plan representation of a conveyer system embodying the features of the invention, showing only one work station;

Fig. 2 is an enlarged fragmentary plan view, partly in section, of an article discharge or diverting mechanism provided at each station, the mechanism being shown removed from the conveyer element and with the parts shown partly operated;

Fig. 3 is a fragmentary vertical section taken on the line 3—3 of Fig. 2 with a portion of the main conveyer shown in operative relation therewith;

Fig. 4 is a vertical section taken on the line 4—4 of Fig. 2 and showing the relation of the conveyer elements to the discharge mechanism;

Fig. 5 is a detail view of a trip trigger of the discharge mechanism, shown operated to a different position than that shown in Fig. 3;

Fig. 6 is an enlarged fragmentary plan view, partly in section, of an article loading mechanism provided at each work station, the mechanism being shown removed from the conveyer elements and with the parts shown partly operated;

Fig. 7 is a fragmentary front elevation of Fig. 6, partly in section;

Fig. 8 is an end view, partly in section, looking at the right end of Fig. 6, and showing the relation of the conveyer elements to the loading mechanism;

Fig. 9 is a vertical section taken on the line 9—9 of Fig. 7;

Fig. 10 is a detail vertical section taken on the line 10—10 of Fig. 9, and

Fig. 11 is a vertical irregular section taken on the line 11—11 of Fig. 6, showing the parts in a normal or inoperative position.

Referring now to the drawings, and particularly to Fig. 1, the features of this invention have been shown embodied in a selective distributing system for conveying can-like articles such as loading coils 15 to and from predetermined work or inspection stations 16 spaced at intervals around and adjacent a continuously traveling endless main conveyer 17 disposed in a horizontal plane. In the drawings, for the sake of simplicity, the conveyer 17 is shown fragmentarily and its path of travel, which it may take in one embodiment of the invention, is indicated by dot and dash lines in Fig. 1. Also, although only one work station 16 is shown in Fig. 1, it is to be understood that a plurality of such stations are provided in the system.

The main conveyer 17 includes a sprocket chain 18 continuously driven at a desired speed by a suitable source of power (not shown) in the direction indicated by the arrow (Fig. 1). Attached to upper surfaces of the conveyer chain 18 at suitable equally spaced intervals and centered laterally therewith are carriers 19 providing a horizontally disposed platform for carrying the coils 15 between the stations 16, the rear end of the carriers having a vertical wall which serves as a stop for the coil while being discharged or diverted from the carrier in a manner hereinafter described. At each side of the chain 18 and suitably spaced form the vertical sides of the carriers 19 are side rails 22 having recessed ledges 23 (Fig. 4) on their inner sides upon which the lower surfaces of the outer ends of the carriers are slidably supported. Fixed to the underside of the chain 18 at intervals corresponding to the carriers 19 but predeterminedly spaced from the rear vertical wall of the carrier and extending laterally thereof, as indicated in dotted outline in Fig. 1, are bars 24 formed with longitudinally extending shouldered runways 25 (Fig. 3) upon each of which rides a roller supported pilot member or pin 26 extending below the lower surface of the bar.

At each work station 16 (Fig. 1), an endless belt 30 is disposed adjacent to and arranged to travel in the same direction and at or about the same speed as the main conveyer 17, receiving its motion from a suitable source of power (not shown). An individual belt 30 may be provided at each station 16 or one belt may serve a plurality of stations depending on the distance between the stations or other considerations. The upper surface of the belt 30 lies substantially in the plane of the upper surfaces of the carriers 19, the coils 15 at one point along the station 16 being diverted from the carriers 19 onto the belt and at another point of the station from the belt to the carriers, through suitably shaped openings 31 and 32 formed in the outer side rail 22, by discharge or diverting and loading or transferring mechanisms 33 and 34, respectively, (Figs. 1, 2 and 6). The mechanisms 33 and 34, to be hereinafter described, are suitably spaced from each other and adjacent opposite ends of a work or testing jig for the coils 15, indicated generally by the numeral 37 (Fig. 1). Extending across but spaced from the upper surface of the belt 30 at a suitable point between the discharge and loading mechanisms 33 and 34, respectively, is a stop member 38 which serves to prevent the coils 15 from being conveyed past the work or testing jig 37, after their discharge from the carriers 19 of the traveling conveyer 17 onto the traveling belt 30, in a manner hereinafter described.

The discharge or diverting mechanism 33, referring particularly to Figs. 2, 3 and 4, comprises a U-shaped frame 39 having a lower horizontal member or floor which extends underneath the belt 30 and the conveyer 17. Vertical arms of the frame 39 extend upwardly at opposite sides of the conveyer 17 and the belt 30 and provide a support for the inner side rail 22 of the conveyer and an outer side rail 40 of the belt. Journaled in the frame 39, at the right end thereof as viewed in Figs. 2 and 3, are horizontal shafts 41 and 42 operatively interconnected at one end by gears 45. Adjustable longitudinally on the shaft 41 but keyed to rotate therewith is an actuating lever or arm 46. The shaft is flattened on its periphery as indicated at 47 (Fig. 4) and is provided with a series of spaced apertures 48, corresponding in number to the number of work stations of the conveyer system, eleven being provided in the present embodiment of the invention. A shouldered pin 49 threaded through the actuating arm 46 and extending into a selected aperture 48 retains the arm in a selected position. The arm 46 at its outer end is formed with a concave surface for engagement by the pilot pins 26 of the main conveyer in a manner to be hereinafter described.

Fixed to rotate with the shaft 42 is a cam member 52 having a vertical flange forming a diagonal cam surface 53 (Fig. 2) lying in the path of the pilot pins 26 when the cam member 52 is in a horizontal position as shown in Figs. 2, 3 and 4. When a pilot pin 26 engages the actuating arm 46, the shaft 41 is rotated counterclockwise about 45° and through the meshing gears 45 fixed to the shafts 41 and 42 the shaft 42 is rotated a similar distance in a clockwise direction thereby raising the cam member 52 from its normal dotted outline position (Fig. 3), where it rests upon a rubber block 54 fixed to the floor of the frame 39, to the full line horizontal position shown in Figs. 2, 3 and 4. In moving upwardly the cam member 52 engages an arm 55 of a yieldable pivotal trip member 56 lying in its path and when the cam member reaches a level or horizontal position the end of the trip member arm 55 snaps into engagement with a beveled surface of the cam member and retains it in a horizontal position, as shown in Fig. 3. A stop pin 59 engaging an arm 60 of the trip member 56 serves to normally position the arm 55 thereof in the path of the cam member 52. As the pilot pin 26 continues to move forward it engages the cam surface 53 of the cam member 52 and is moved with its roller support upon the bar 24 attached to the conveyer chain 18, to a predetermined lateral position where it rides off the cam member 52. The pilot pin 26 is now operatively positioned for actuating the loading mechanism 34 in a manner to be described hereinafter. In the continued advance of the pilot pin 26 it engages a vertical trip arm 61 of the yieldable trip member 56 and rocks it counterclockwise, thereby moving the arm 55 of the lever from engagement with the cam member 52 which thereafter falls by gravity to its dotted outline position (Fig. 3).

Journaled in the frame 39 is a vertical shaft 62 having affixed at its upper end an arm 63 which extends diagonally across the conveyer 17 and in the path of the coils 15 being conveyed. A spring 64 (Fig. 2) operatively connected to the shaft 62 adjacent its lower end serves to normally hold the arm diagonally across the path of the coils 15 as shown in full lines in Figs. 2 and 4. A stop pin 65 serves to limit the counterclockwise movement of the arm 63, occurring in the operation of the mechanism when an article is not diverted at a station 16, the arm then being rocked clockwise and then springing back to its normal diagonal position. Fixed to the end of the shaft 42 opposite the gear 45 is an arm 66 which when the shaft is rotated clockwise, as before described, is swung upwardly in front of a lug 67 carried by the shaft 62 thereby preventing the arm 63 from swinging in a clockwise direction and consequently when a coil 15 is advanced into engagement therewith it will be forced or deflected laterally off of its carrier 19, through the opening 31 (Fig. 1) in the side rail 22 and onto the traveling belt 30.

Upon the frame 39 at a point substantially opposite the shaft 62 is journaled a vertical shaft 68 carrying at its upper end an arm 69 which extends diagonally across the belt 30 and in the path of the coils 15 deflected from the main conveyer 17. The arm 69 is held in its normal position as shown in full lines in Figs. 2 and 4 by a spring 70 operatively connected to the shaft 68 adjacent its lower end. The shaft 68 at its lower end carries an arm 73 which is connected to an arm 74 of a lever 75 by a link 76, the lever 75 being pivoted on a vertical axis adjacent the yieldable trip member 56. The lever 75 is provided with an arm 77 which is so positioned relative to the arm 60 of the trip member 56 that it may be moved into locking engagement therewith (Fig. 5). The arm 69 carried by the shaft 68 freely swings aside as each of the coils 15 are advanced therepast and in case the belt 30 is full of coils between the right side of the stop member 38 (Fig. 1) and the point of discharge of the coils 15 from the carrier 19 of the conveyer 17 the arm will be held aside by the last deflected coil and through the interconnecting link 76 between the arms 73 and 74 the lever 75 will be rotated to move the arm 77 thereof over the arm 60 of the trip member 56 and thereby prevents the same from returning to its normal position. This movement of the arm 69, by the diverted coil 15, which effects a movement of the arm 77 into operative position for locking the trip member 56 is correlated with the counterclockwise rotation of the trip member 56 as the pilot pin 26 engages and moves past the arm 61 thereof. The arm 55 of the trip member 56 is thus held out of the path of the cam member 52 so that the latter cannot be locked in its horizontal position by any following pilot pins 26 and thereby any coils intended to be discharged at this particular station will move therepast and continue around the system until it arrives at another station which is set to receive it or until the filled station is emptied to a point which will permit the arm 69 to assume its normal diagonal position across the belt 30. By this means a station may be kept full of coils to be worked or tested, but the overloading of stations and the jamming resulting therefrom are eliminated.

The loading or transferring mechanism 34, referring particularly to Figs. 6 to 11, inclusive, comprises a U-shaped frame 80 of substantially the same general type as the frame 39 of the discharge or diverting mechanism 33 and is associated with the conveyer 17 and the belt 30 in a manner similar to that described for the frame 39. Journaled in the frame 80 is a horizontal shaft 81 to which is fixed to rotate therewith and slidable therealong by means of a suitable spline connection (not shown) a clutch member 83 provided with teeth 84 engageable in depressions 85 formed in a clutch member 88 freely rotatable on the shaft 81 but slidably held from moving longitudinally thereon. Adjustable angularly on the clutch member 88, as indicated at 89 (Fig. 11), is an actuating lever or arm 90 formed at its outer end with a concave surface for engagement by the traveling pilot pins 26 when alined therewith. An arm 91 of the clutch member 88 is normally held against a stop member 92 by a tension spring 95, whereby the clutch member 88 and the arm 90 carried thereby are returned to their normal positions (Fig. 11) after each actuation thereof.

Rotatable with the shaft 81 is a cam member 96 (Figs. 6, 7 and 8) operatively alined with a spring pressed plunger 97 of an air valve 98, to be referred to hereinafter. The shaft 81 at its right end (Fig. 8) carries a gear 99 which meshes with a similar gear 99 fixed to a shaft 100 (Figs. 6 and 9). Secured for rotation with the shaft 100 and splined for movement longitudinally thereof as indicated at 103 (Figs. 6, 9 and 11) is a cam member 104, having a vertical flange forming a diagonal cam surface 105 which lies in the path of the pilot pins 26, when the cam member 104 is in a horizontal position, as shown in Figs. 6 and 8.

When a pilot pin 26 engages the arm 90 the shaft 81 is rotated counterclockwise about 45°, providing the clutch members 82 and 88 are engaged in a manner to be described hereinafter, and through the meshing gears 99, fixed to the shafts 81 and 100, the shaft 100 is rotated a similar distance in a clockwise direction. This movement of the shaft 100 raises the cam member 104 from its normal position (Fig. 11) where it rests at its free end upon a rubber block 106 fixed to the floor of the frame 80 to its operative horizontal position as shown in dotted outline. At its free left end (Figs. 6 and 11) the cam member carries a yieldable pivotal trip member 107 having a depending arm 108 which is engaged with a vertical wall of the frame 80 and when the cam member 104 reaches a horizontal position the arm 108 of the trip member 107, which has slightly turned on its pivot, snaps into engagement with a beveled upper surface of the vertical frame wall and retains it in its upper level position. As the pilot pin 26 advances past the free end of the cam member 104 it engages a vertical arm 109 of the trip member 107 and rocks it counterclockwise thereby moving the arm 108 from engagement with the beveled retaining surface and the cam member then falls by gravity to its normal position as shown in Fig. 11.

Disposed below the shaft 100 is a shaft 110 formed with a threaded portion 111 which is threaded through a follower 112 slidable on the shaft 100 between spaced bearing portions of the cam member 104, the follower 112 being freely rotatable relative to the shaft 100. The left end of the shaft 110 (Fig. 9) projects through the front wall of the frame 80 and is equipped with a wheel 113 having an eccentrically arranged spring pressed knob or handle 114, the inner end of which normally engages in an aperture 115 in the front wall of the frame 80 to retain it in a predetermined position after each complete revolution thereof. One revolution of the knob 114 imparts one complete rotation to the shaft 110 and through the threaded portion 111 cooperating with the follower 112 the cam member 104 is laterally adjusted a predetermined distance on the shaft 100 either to the right or left, as viewed in Fig. 9, in accordance with the direction of rotation of the shaft 110 effected by means of the knob 114. The pitch of the cooperating threads on the shaft 110 and the follower 112 is such that one rotation of the shaft moves the cam member 104 a fixed distance corresponding to the space between adjacent positions of the actuating arm 46 of the discharge mechanism 33. An indicator 116 and associated indices 117 upon the front wall of the frame 80 (Fig. 7), the indicator being operatively connected to the shaft 110 by means of a suitable Geneva motion mechanism indicated generally by the numeral 118, serves to indicate to an operator at all times the lateral position of the cam member 104. In the present embodiment of the invention eleven indices 117 are provided representing eleven stations for the conveyer system. The lateral adjustment of the cam member 104 and the purpose thereof will be described hereinafter.

During the raising of the cam member 104, secured to the shaft 100, effected by a pilot pin 26 engaging the actuating arm 90, a dog 119 fixed to the shaft 100 is moved into a notch 120 formed in a collar 121 fixed to the shaft 110 (Figs. 9 and 10). The shaft 110 is thus locked against rotation after the cam member 104 has been raised and consequently an operator cannot adjust the cam member 104 laterally, by manipulating the knob 114, at this time, but must await the lowering of the cam member 104 to its normal position (Fig. 11).

Journaled in the frame 80 adjacent the front wall thereof is a vertical shaft 122 having fixed at its upper end an arm 123 which extends across the conveyer belt 30 in the path of the coils 15 disposed thereon. The lower end of the shaft 122 at a point below the belt 30 (Figs. 6 and 8) carries an arm 124 connected to one end of a link 125, the opposite end of the link being connected to a bell crank lever 126 pivoted on the frame adjacent the clutch member 83. The bell crank lever 126 is provided with a yoke portion carrying pins 130 which extend into an annular channel 131 formed in the clutch member 83 at diametrically opposite points. A tension spring 150

132 (Fig. 6) attached to the arm 124 serves normally to hold the teeth 84 of the clutch member 83 out of engagement with the depressions 85 of the clutch member 88 but when a coil 15 (shown in dotted outline in Fig. 6) being conveyed by the belt 30 engages the arm 123, the force of the spring is overcome, and the bell crank lever 126 is rocked counterclockwise (Fig. 6) thereby interengaging the clutch members 83 and 84. A stop pin 133 carried by the arm 123 and engaging a stop 134 fixed to the frame 80 limits the movement of the arm 123 and the connected parts when the coil 15 is conveyed thereagainst.

A second vertical shaft 137 is journaled in the frame 80 to the left of the shaft 122 and has secured to rotate therewith a transfer arm 138 normally assuming the position shown in Fig. 6. The transfer arm 138 in the operation of the loading mechanism, to be referred to hereinafter, serves to move the coil 15 advanced against the arm 123 by the belt 30 from the latter to an empty carrier 19 traveling with the chain 18. Freely rotatable upon the shaft 137 above the transfer arm 138 is a stop arm 139 which is yieldably connected to the transfer arm by a spring 140. When the transfer arm 138 is operated to move the first coil 15, referring to Fig. 6, which is in the line of coils to be transferred to empty carriers 19, the stop arm 139 follows, due to its interconnection with the transfer arm by the spring 140, and moves in front of the second coil 15 in the line and holds the rest of the coils in position during the transfer operation and while the transfer arm is moving back to its normal position (Fig. 6). For operating the transfer arm 138 a pneumatic cylinder and piston assembly 143 (Fig. 6) is provided, the piston of which is connected to the shaft 137. The actuation of the cylinder piston and connected parts is effected by air pressure when the valve 98 is opened and the return thereof to normal position is by means of a compression spring (not shown) mounted in the cylinder. A piston rod 144 is connected by a link 145 to a lever 146 fixed to the lower end of shaft 137. The air valve 98 is connected to the pneumatic cylinder 143 by piping 147 and to a suitable source of air pressure supply by piping 148.

In the operation of the above described automatic selective distributing conveyer system wherein provision is made for serving eleven work or inspection stations 16 arranged around the endless conveyer 17 (Fig. 1), it is to be understood that each station will have its own individual setting of the actuating arm 46 along the shaft 41 of the article discharge or diverting mechanism 33. Also, it will be obvious that the cam member 104 of the article loading mechanism 34 at each station may be manually laterally adjusted along the shaft 100 by the mechanism, hereinbefore described, controlled by means of the hand knob 114, and consequently the pilot pin 26 of any carrier 19 leaving any station may be set laterally on its supporting bar 24 to engage any one of the actuating arms 46 at the other stations. Furthermore, the actuating arm 46 of each of the discharge mechanisms 33 positioned at each of the stations 16 are individually adjustable so that the coils may be delivered to any desired stations without changing the positions of the pilot pins.

The articles 15 to be worked on or inspected may be initially positioned on the carriers 19 as the latter pass any convenient point of the system, either manually or by any suitable automatic feeding and loading mechanism (not shown).

Referring particularly to Figs. 1, 2 and 3, the pilot pin 26 associated with the carrier 19, which has been advanced to a position below the article deflecting arm 63 (Fig. 1) has engaged and actuated the actuating arm 46 of the station 16, the particular pilot pin having been previously adjusted for this particular station upon leaving one of the other stations, in the manner previously described. The actuation of the arm 46 caused the cam member 52 to be raised to and held in its horizontal position, as shown in the drawings, and also simultaneously locked the article deflecting arm 63 from movement as the coil 15 mounted on the carrier 19 is advanced thereagainst, all in a manner which is believed to be clearly evident from the previous description. In the continued advance of the carrier 19 the coil 15 supported thereon is moved laterally from the carrier 19 through the opening 31 in the side rail 22 of the conveyer 17 and onto the traveling belt 30, moving the arm 69 to one side, and is conveyed against the stop member 38. As the empty carrier 19 continues in its advance the corresponding pilot pin 26 engages the cam surface 53 of the member 52 and is deflected to a predetermined position laterally of the supporting bar 24 into alignment with the actuating arm 90 of the coil loading mechanism 34, which it actuates in the continued advance thereof. As the pilot pin 26 rides off the cam member 52 it trips the yieldable trip member 56, permitting the cam member to drop to its normal position (Fig. 3). The coil discharge or diverting mechanism 33 is now returned to a normal condition ready to be actuated again when a loaded carrier 19 having its pilot pin 26 set for this particular station engages the arm 46.

In case the belt 30 is full of coils 15, awaiting inspection by an operator, the arm 69 will be held aside from its normal position across the belt 30 by the last discharged coil and through the mechanism previously described the yieldable trip member 56 will be locked out of engagement with the cam member 52 and consequently the latter cannot be locked in its horizontal position by any following pilot pins 26. This prevents the deflecting arm 63 from being locked in its deflecting position across the conveyer 17 by the cooperating arm 66 and lug 67 carried by the shafts 42 and 62, respectively. The coils intended to be discharged at this particular station will then be advanced therepast and continue around the system until a station is reached having its discharge mechanism 33 set to receive them or until the filled station is ready to receive additional coils.

The discharged or diverted coil which is supported on the traveling belt 30 and abutting the stop member 38 is removed by the operator and tested or worked on at the jig 37 and is then placed on the belt 30 at the opposite side of the stop member and is conveyed by the belt into operative relation with the arm 123 of the coil loading mechanism 34. The movement of the coil 15 against the arm 123 rotates it slightly in a counterclockwise direction and by means of the lever and link mechanism, hereinbefore described, the clutch member 83 is moved into clutching engagement with the clutch member 88 (Fig. 6), thus preparing the loading or transfer mechanism 34 for operation by the pilot pin 26 of the first empty carrier 19 approaching the same. The coil or coils on the belt 30 at the left of the stop member 38 (Fig. 1) will be automatically loaded successively onto empty carriers 19 as they pass the loading mechanism 34, the empty carriers having had their pilot pins 26, as hereinbefore described, laterally adjusted, as they left the discharge mechanism 33, for alignment with the arm 90 of the loading mechanism 34.

It is to be understood that each of the pilot pins 26 is similarly laterally adjusted by the cam member 52 in the manner above referred to, after the pin 26 has actuated the actuating arm 46 of any of the stations 16 so that the pin will in its advance actuate the arm 90 of the first loading mechanism 34 which it engages and an article 15 will be loaded onto the corresponding carrier 19 if an article is operatively related to the arm 123 of the mechanism 34. In case an article 15 is not in position to be loaded onto the carrier 19 at a particular station the actuating arm 90 thereof will be idly rocked about its pivot and the empty carrier will continue around the system until this same station, or another station, is reached having its loading mechanism ready to load articles onto the carrier.

In Fig. 11 the pilot pin 26 is shown as about to engage the arm 90 and in Fig. 6 it is shown as having advanced into engagement with and actuated the same and thereby caused the cam member 104 to be raised to and held in its horizontal position in a manner which is believed to be clearly evident from the previous description. Simultaneously with the cam member 104 being held in its operative position the cam member 96 (Figs. 6, 7 and 8) rotatable with the shaft 81 moves into engagement with the plunger 97 of the air valve 98 and opens the same to connect the air pressure supply piping 148 with the piping 147 connected to the pneumatic cylinder and piston assembly 143. The operation of the cylinder and piston assembly 143 results in an actuation of the coil transfer arm 138 and the stop arm 139, yieldably connected to the transfer arm, in the manner hereinbefore described. The coil 15 engaged with the arm 123 is thus transferred from the belt 30 through the opening 32 in the side rail 22 of the conveyer 17 to an empty carrier 19 moving past the opening 32 in timed relation with the movement of the transfer arm 138. In case a line of coils 15 are awaiting transfer on the belt 30 the stop arm 139, in the manner hereinbefore described, holds the rest of the coils from moving ahead during the transfer of the coil, which is engaging the arm 123, and while the transfer arm is moving back to its normal position.

In the continued advance of the pilot pin 26 after actuating the arm 90 and associated mechanism to transfer the coil 15 from the belt 30 to the empty carrier 19 it engages the cam surface 105 of the cam member 104 and is deflected laterally a predetermined distance dependent on the previous lateral adjustment of the cam member 104, in the manner previously described, effected by manipulating the hand knob 114. As the pilot pin 26 rides past the cam member 104 it trips the yieldable trip member 107, permitting the cam member to drop to its normal position (Fig. 11). With the return of the cam member 104 to its normal position the loading or transfer mechanism 34 is ready to be actuated again when the pilot pin 26 of the first empty carrier 19 engages the trip arm 90.

Although a specific embodiment of this invention has herein been disclosed and described, it is to be understood that other modifications and adaptations thereof may be made without departing from the scope of the appended claims.

What is claimed is:—

1. In a conveying and distributing system, a traveling article conveyer, a plurality of stations spaced therealong, normally ineffective means positioned in the path of articles at each station for diverting articles from said conveyer to said stations, means permanently carried by and movable with said conveyer for selectively rendering effective the several diverting means for transferring articles from the conveyer to predetermined ones of said stations, and latch means at each station for holding the diverting means effective during the transfer of the articles.

2. In a conveying and distributing system, a traveling article conveyer, a plurality of stations spaced therealong, normally ineffective means positioned in the path of articles at each station for diverting articles from said conveyer to said stations, each of said means including an adjustable actuator selectively positioned for the respective stations, means carried by and movable with said conveyer and cooperating with said adjustable actuators for selectively rendering effective the several diverting means for transferring articles from the conveyer to predetermined ones of said stations, and automatically actuated latch means at each station for holding the diverting means effective during the transfer of the articles.

3. In a conveying and distributing system, a traveling article conveyer, a plurality of stations spaced therealong, normally ineffective means at each station for diverting articles from said conveyer to said stations, adjustable elements carried by and movable with said conveyer for selectively rendering effective the several diverting means for transferring articles from the conveyer to predetermined ones of said stations, normally ineffective means rendered effective simultaneously with the rendering effective of the diverting means for predeterminedly adjusting the elements on said conveyer in the continued advance of the elements after the diverting means have been rendered effective.

4. In a conveying and distributing system, a traveling article conveyer, a plurality of stations spaced therealong, normally ineffective means positioned in the path of articles at each station for diverting articles from said conveyer to said stations, adjustable means carried by and movable with said conveyer for selectively rendering effective the several diverting means for transferring articles from the conveyer to predetermined ones of said stations, latch means at each station responsive to the rendering effective of its diverting means for holding the diverting means effective during the transfer of the articles, and means for adjusting the adjustable means to render the same effective at predetermined stations.

5. In a conveying and distributing system, a traveling article conveyer, a plurality of stations spaced therealong, means at each station for diverting articles from said conveyer to said stations, means including an adjustable element carried by said conveyer for selectively rendering effective the several diverting means for transferring articles from the conveyer to predetermined ones of said stations, an adjustable member at each station for automatically predeterminedly adjusting the element on the conveyer as it moves past the station to cause an article being conveyed therefrom to be transferred to a predetermined one of said stations, and manual operable means operatively related to the adjustable member at each station for adjusting said member to effect a predetermined adjustment of the element.

6. In a conveying and distributing system, a traveling article conveyer, a plurality of stations spaced therealong, normally ineffective article diverting members extending diagonally across said conveyer in the path of articles carried thereby at each station, means at each station for rendering the respective diverting members effective, an element selectively positioned on and permanently movable with said conveyer for selectively actuating the several means to render effective the respective diverting members to transfer articles from the conveyer to predetermined ones of said stations, and means at each station responsive to the rendering effective of the respective diverting member for holding the diverting members effective during the transfer of the articles.

7. In a conveying and distributing system, a traveling article conveyer, a plurality of stations spaced therealong, adjacent article diverting and loading means at each station, adjustable means carried by and movable with the conveyer for selectively rendering effective the several diverting means for transferring articles from the conveyer to predetermined ones of said stations, and means associated with each diverting means for automatically predeterminedly adjusting the selective means on the conveyer in the continued advance thereof after the diversion of an article for actuating the adjacent loading means to transfer an article predeterminedly positioned relative to said loading means onto the conveyer.

8. In a conveying and distributing system, an endless traveling article conveyer, a plurality of stations spaced around the same, normally ineffective spaced article diverting and loading means at each station, a second traveling article conveyer extending between said means, adjustable elements carried by and movable with the first conveyer for selectively rendering effective the several diverting means for transferring articles from the first conveyer to the second conveyer at predetermined one of said stations, a stop for limiting the movement of the articles by the second conveyer, and means for automatically predeterminedly adjusting the elements on the first conveyer in the continued advance thereof after the diversion of an article at one of said stations for actuating said loading means at said station to transfer an article, manually positioned at the other side of the stop and conveyed into a predetermined position relative to said loading means, from the second conveyer to the first conveyer.

9. In a conveying and distributing system, an endless traveling article conveyer, a plurality of stations spaced therealong, means at each station for diverting articles from said conveyer to said stations, means including a clutch and an actuating lever therefor at each station for transferring articles to the conveyer, adjustable means permanently carried by and movable with said conveyer for causing the actuation of the transfer means at any one of said stations when an article is predeterminedly positioned relative to the lever to cause the latter to actuate the clutch, and means at each of said stations for adjusting the adjustable means on the conveyer to render the same effective at predetermined stations for causing the actuation of the respective diverting means.

10. In a conveyer and distributing system, a traveling article conveyer, a plurality of stations spaced therealong, means at each station for diverting articles from said conveyer to said stations, said means including a normally ineffective article diverting element positioned diagonally across said conveyer in the path of articles carried thereby, a member movable into operative relation with said element to render it effective, means including an actuator selectively positioned for the respective stations for moving the member, adjustable elements carried by and movable with said conveyer, said elements mounted for predetermined lateral adjustment on said conveyer for engaging said actuators to selectively render effective the several diverting elements for transferring articles from the conveyer to predetermined ones of said stations, and normally ineffective means rendered effective simultaneously with the rendering effective of the diverting means for predeterminedly adjusting the elements laterally on said conveyer in the continued advance of the elements after the diverting means have been rendered effective.

11. In a conveying and distributing system, a traveling article conveyer, a plurality of stations spaced therealong, means at each station for diverting articles from said conveyer to said stations, means for transferring articles to the conveyer, said means including a normally ineffective actuator for rendering the transfer means effective, a pivotal arm operatively connected to said actuator and rendering the latter effective when an article to be transferred to said conveyer is predeterminedly associated with the arm to cause its operation, adjustable elements carried by and movable with said conveyer for engaging said actuator and rendering the transfer means effective to transfer the article associated with the arm to said conveyer, and an adjustable cam member in the path of the adjustable elements for positioning them on the conveyer as they move past the transfer means for rendering effective the several diverting means for causing the transferred articles to be diverted at predetermined ones of said stations.

12. In a conveying and distributing system, a traveling article conveyer, a plurality of stations spaced therealong, means including a pivotal arm at each station for transferring articles to the conveyer, means carried by and movable with the conveyer for causing the actuation of the transfer means at ony one of said stations when the advance article in a series of abutting predeterminedly aligned articles awaiting transfer is predeterminedly positioned relative to the transfer means, and a stop element yieldably connected to said pivotal transfer arm and responsive to the actuation thereof for holding the other articles of the series in position during the actuation of the transfer arm and during its return movement.

HENRY M. LARSEN.
HERBERT D. BREDEHORN.